United States Patent
Haridoss et al.

(10) Patent No.: US 6,821,661 B2
(45) Date of Patent: Nov. 23, 2004

(54) HYDROPHILIC ANODE GAS DIFFUSION LAYER

(75) Inventors: Prathap Haridoss, Chennai (IN); Chockkalingam Karuppaiah, Troy, NY (US); James F. McElroy, Suffield, CT (US); Jeffrey R. Boyer, Nishayuna, NY (US); Eric G. Budesheim, Wynantskill, NY (US)

(73) Assignee: Plug Power, Inc., Latham, NY (US)

( * ) Notice: Subject to any disclaimer, the term of this patent is extended or adjusted under 35 U.S.C. 154(b) by 210 days.

(21) Appl. No.: 10/232,292

(22) Filed: Aug. 30, 2002

(65) Prior Publication Data

US 2003/0104267 A1 Jun. 5, 2003

Related U.S. Application Data (60) Provisional application No. 60/316,500, filed on Aug. 31, 2001.

(51) Int. Cl.[7] .......................... H01M 8/00; H01M 8/10; H01M 2/00; H01M 4/86
(52) U.S. Cl. .............................. 429/13; 429/33; 429/34; 429/44
(58) Field of Search .............................. 429/13, 30, 33, 429/34, 38, 39, 42, 44

(56) References Cited

U.S. PATENT DOCUMENTS 5,350,643 A * 9/1994 Imahashi et al. ............. 429/33

* cited by examiner

*Primary Examiner*—Patrick Ryan
*Assistant Examiner*—Thomas H. Parsons
(74) *Attorney, Agent, or Firm*—Trop, Pruner & Hu, P.C.

(57) ABSTRACT

The invention provides an anode gas diffusion layer for a fuel cell and methods for preparation and use thereof. In particular, a hydrophilic anode gas diffusion layer promotes water transfer through the fuel cell. As an example, in one aspect, the invention provides a fuel cell system, including a fuel cell with an anode gas diffusion layer. The anode gas diffusion layer has a contact angle with water less than 140° (e.g., in some cases less than 120° or less than 100°). In another aspect, the invention provides a gas diffusion layer for a hydrogen electrode of a PEM fuel cell that includes a carbon fiber media having a water contact angle of less than 140°.

36 Claims, 7 Drawing Sheets

HYDROPHILIC ANODE GAS DIFFUSION LAYER

CROSS REFERENCE TO RELATED APPLICATIONS

This application claims priority under 35 USC 119(e) from U.S. Provisional Application No. 60/316,500, filed Aug. 31, 2001, naming Haridoss et al. as inventors, and titled "HYDROPHILIC ANODE GAS DIFFUSION LAYER." That application is incorporated herein by reference in its entirety and for all purposes.

BACKGROUND

The invention generally relates to an anode gas diffusion layer for a fuel cell and methods for preparation and use thereof.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \tag{1}$$

at the anode of the cell, and $$O_2 + 4H^+ + 4e^- \rightarrow 2H_2O \tag{2}$$

at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU), or also as an MEA.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

Figure 1:
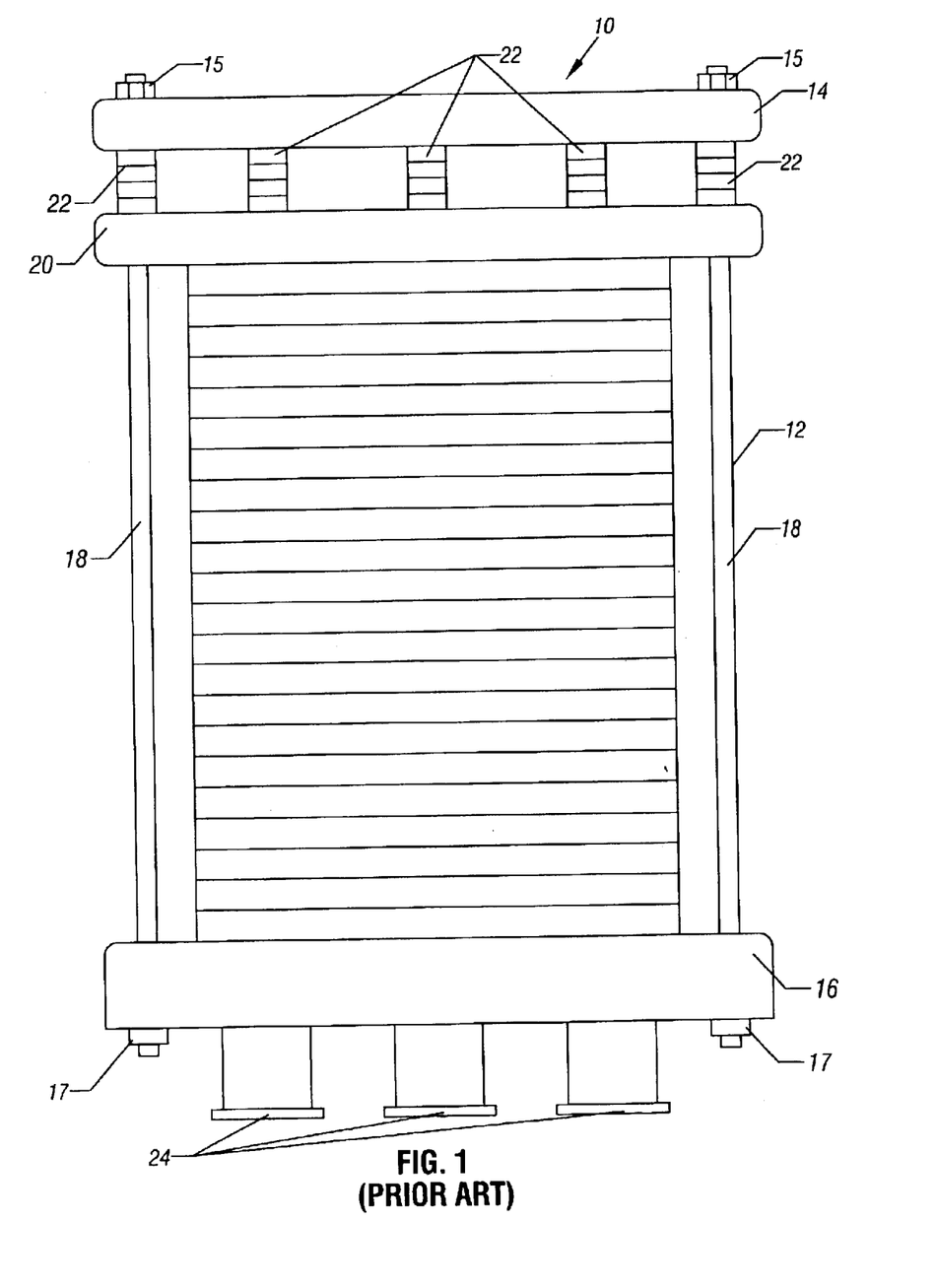
FIG. 1 is a schematic diagram of a fuel cell stack.

FIG. 1 depicts an exemplary fuel cell stack assembly 10, an assembly that includes a stack 12 of flow field plates that are clamped together under a compressive force. To accomplish this, the assembly 10 includes end plate 16 and spring plate 20 that are located on opposite ends of the stack 12 to compress the flow plates that are located between the plates. Besides the end plate 16 and spring plate 20, the assembly 10 may include a mechanism to ensure that a compressive force is maintained on the stack 12 over time, as components within the stack 12 may settle, or flatten, over time and otherwise relieve any applied compressive force.

As an example of this compressive mechanism, the assembly 10 may include another end plate 14 that is secured to the end plate 16 through tie rods 18 that extend through corresponding holes of the spring plate 20. The spring plate 20 is located between the end plate 14 and the stack 12, and coiled compression springs 22 may reside between the end plate 14 and spring plate 20. The tie rods 18 slide through openings in the spring plate 20 and are secured at their ends to the end plates 14 and 16 through nuts 15 and 17. Due to this arrangement, the springs 22 remain compressed to exert a compressive force on the stack 12 over time even if the components of the stack 12 compress.

To establish connections for external conduits (hoses and/or pipes) to communicate the reactants, coolants and product with the manifold passageways of the stack 12, the assembly 10 may include short connector conduits, or pipes 24, that may be integrally formed with the end plate 16 to form a one piece end plate assembly (for example, pipes 24 may be welded to end plate 16).

Figure 2:
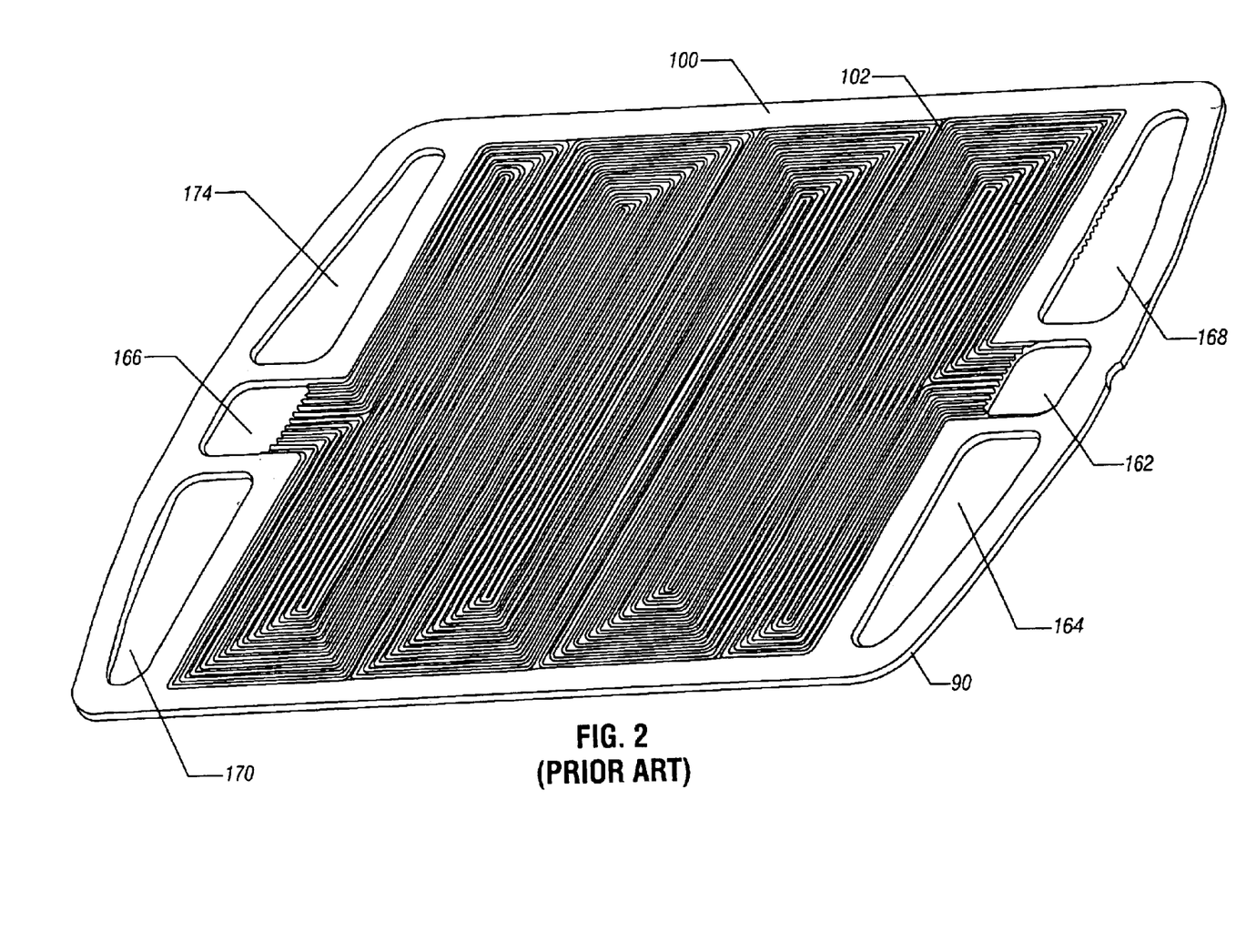
FIG. 2 is a perspective view of a fuel cell flow field plate.

FIG. 2 depicts a surface 100 of an exemplary flow field plate 90. The surface 100 includes flow channels 102 for communicating a coolant to remove heat from the fuel cell stack 10. Flow channels 120 (see FIG. 3) on an opposite surface 119 of the plate 90 may be used for purposes of communicating hydrogen (for an anode plate configuration) or air (for a cathode plate configuration) to a fuel cell MEU.

An opening 170 of the plate 90 forms part of a vertical inlet passageway of the manifold for introducing hydrogen to the flow channels 120 (see FIG. 3); and an opening 168 of the plate 90 forms part of a vertical outlet passageway of the manifold for removing hydrogen from the flow channels 120. Similarly, openings 174 and 164 in the plate 90 form partial vertical inlet and outlet passageways, respectively, of the manifold for communicating an air flow (that provides oxygen to the fuel cells); and openings 162 and 166 form partial vertical inlet and outlet passageways, respectively, of the manifold for communicating the coolant to the flow channels 102. While flow field channels generally have uniform square or circular cross-sectional profiles, channels are also known that have trapezoidal cross-section profiles (channel walls are not perpendicular to channel floors), and square and trapezoidal profiles with channel walls and floors intersected at selected angles or in rounded portions.

Figure 3:
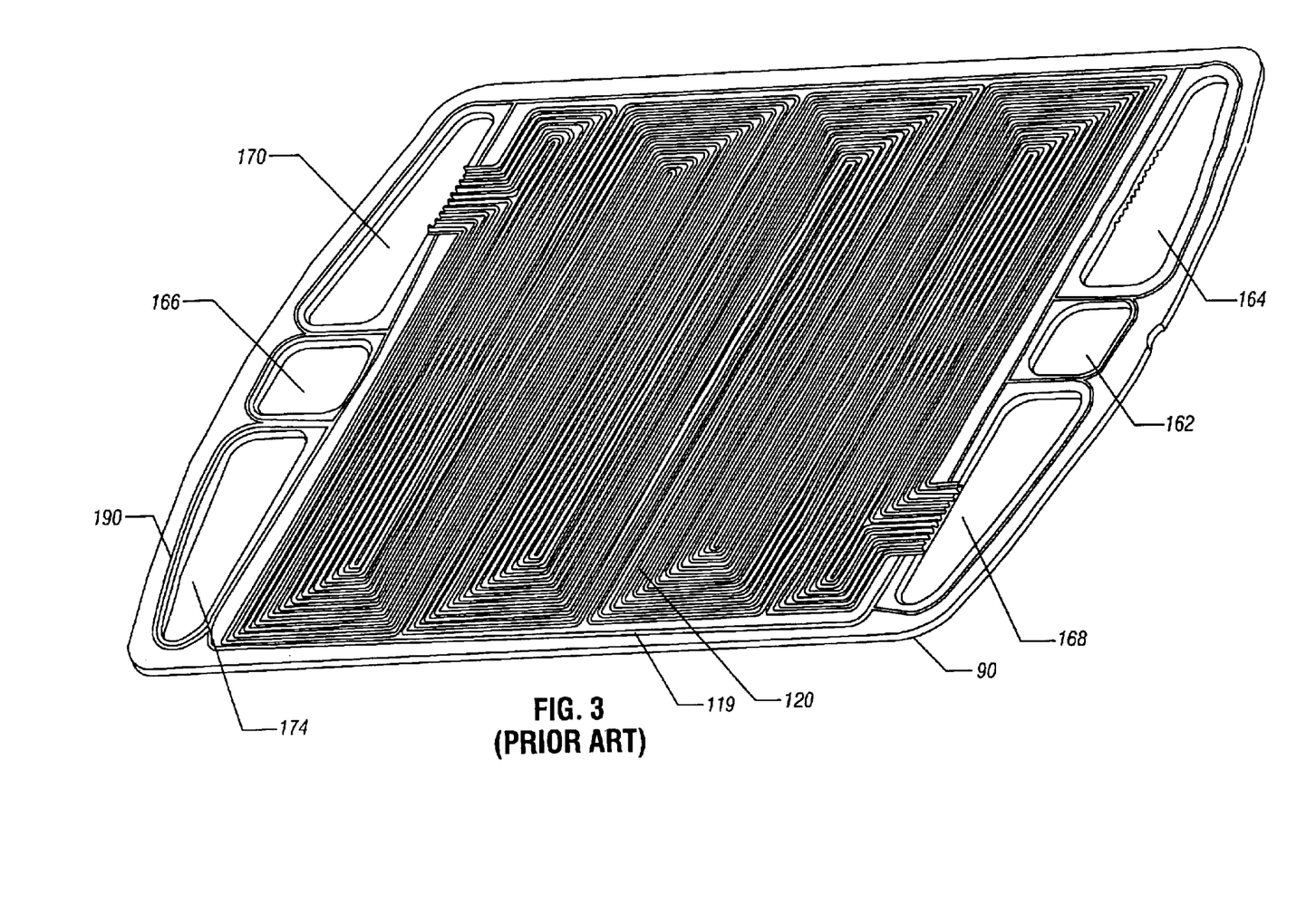
FIG. 3 is a perspective view of a fuel cell flow field plate.

As shown in FIG. 3, the flow field plate 90 may be designed so that a gasket 190 may be formed on either surface 119 or 100 of plate 90. Conventionally, each flow field plate includes a gasket groove on one side to receive a gasket. However, the gasket 190 may also be adhered to or formed on either side of the plate 90.

Figure 4:
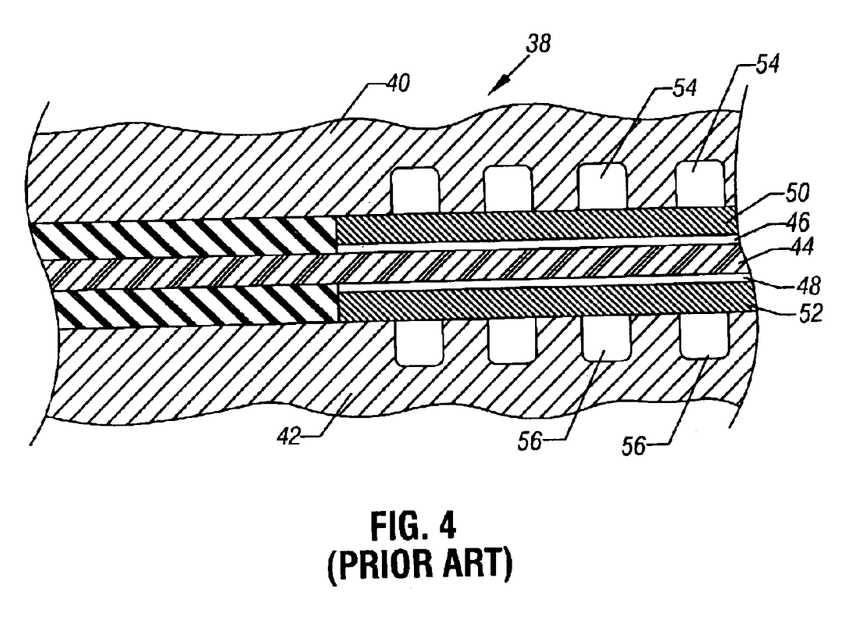
FIG. 4 is a partial cutaway view of a fuel cell.

Referring to FIG. 4, an example of a fuel cell 38 is shown such as those included in the stack shown in FIG. 1, utilizing flow field plates 40 and 42 such as those shown in FIGS. 2 and 3. As an example, fluid flow field plate 40 might serve as an anode side of the fuel cell, circulating reformate through flow field channels 54. Similarly, fluid flow field plate 42 might serve as a cathode side of the fuel cell, circulating air through flow field channels 56. Catalysts 46 and 48, which facilitate chemical reactions, are applied to the anode and cathode sides, respectively, of solid electrolyte 44. The MEA (including PEM 44 and catalyst layers 46 and 48) is sandwiched between anode and cathode GDLs 50 and 52, respectively.

Suitable fuel cell components are well known in the art. As examples, common membrane materials include Nafion™, Gore Select™, sulphonated fluorocarbon polymers, and other materials. Various suitable catalyst formulations are also known in the art, and are generally platinum-based. Other suitable membrane materials include the polybenzimidazole (PBI) membrane available from Celanese, and polyether ether ketone (PEEK) membranes. The GDL's generally comprise either a paper or cloth based on carbon fibers. The flow field plates are generally molded, stamped or machined from materials including carbon composites, plastics and metal alloys. The plates may include various surface flow channels and orifices to, as examples, route the reactants and products through the fuel cell stack. Reactant gases from each side of the PEM may pass along the flow channels and diffuse through the GDLs to reach the PEM.

Many fuel cell membranes, such as the varieties mentioned above, need to be maintained in a hydrated state to function properly. It is especially important to maintain membrane hydration while a fuel cell is operated. If an area of the PEM dries out, the electrochemical reaction in that area may be hindered or may no longer occur. In some cases, permanent damage to the PEM can occur. Dry areas can also eventually spread until a PEM no longer functions. For this reason, fuel cell reactants in such systems are generally saturated with water vapor before they are supplied to the fuel cell. Various methods have been used in the art to accomplish this.

It should also be noted that the fuel cell reaction produces heat and product water at the cathode side of the PEM. If not carefully controlled, the reactants flowing through a fuel cell may become subsaturated with water as they are heated by the fuel cell reaction, and may thus tend to dry out the PEM. Nevertheless, excess product water (in excess of the amount required to keep the reactants and PEM saturated) must be removed in order to prevent blockage of the flow field channels and gas diffusion layers that could prevent reactant gasses from reaching the fuel cell catalysts. Likewise, the temperature of the reactants flowing through the cells must be carefully controlled to prevent any condensation of water into the cells that could have the same effect.

Various water management methods have been used to address these factors. For example, a coolant associated with a fuel cell may be circulated to control the temperature rise of the reactants flowing through the flow field channels such that the reactant streams remain saturated as they remove product water formed in the cells. In some cases, subsaturated reactants may be flowed through a fuel cell for a period to dry out the cell when it appears "flooded" by excess water. Water tends to diffuse rapidly through most PEMs, so that a subsaturated reactant flow on one side of the PEM can serve to remove excess water from both sides of the PEM. The flow rate of reactant flowed through the fuel cells relative to the electrical load on the cells (also referred to as reactant stoichiometry or "stoich") may also be increased to help remove water from the cells.

There is a continuing need for fuel cell design and method improvements associated with water management to address factors including the foregoing in a robust, cost-effective manner.

SUMMARY

The invention provides an anode gas diffusion layer for a fuel cell and methods for preparation and use thereof. In particular, a hydrophilic anode gas diffusion layer promotes water transfer through the fuel cell. As an example, in one aspect, the invention provides a fuel cell system, including a fuel cell with an anode gas diffusion layer. The anode gas diffusion layer has a contact angle with water less than 140° (e.g., in some cases less than 120° or less than 100°). In another aspect, the invention provides a gas diffusion layer for a hydrogen electrode of a PEM fuel cell that includes a carbon fiber media having a water contact angle of less than 140°.

In some embodiments, the cathode gas diffusion layer is relatively hydrophobic with a water contact angle greater than 140° (other contact angle ranges may also be specified, such as a cathode gas diffusion layer with a water contact angle greater than 120°). In general, it may thus be desirable to provide a cathode gas diffusion layer that is relatively hydrophobic, and an anode gas diffusion layer that is relatively hydrophilic. For example, the water contact angle of the anode gas diffusion layer could be specified as 10% lower than the water contact angle of the cathode gas diffusion layer. Other ranges may be specified.

In some embodiments, a gas diffusion layer comprises a substrate impregnated with a material such that the contact angle with water of the gas diffusion layer with the material is less than the contact angle with water for the gas diffusion layer without the material. As an example, the gas diffusion layer can be a carbon paper or cloth. In some cases, the carbon paper functions as a substrate, which is impregnated with a material such that the contact angle with water of the gas diffusion layer with the material is less than the contact angle with water for the gas diffusion layer without the material. Examples of such materials include oxides, silica, and desiccant materials.

In some embodiments, it is desirable to provide a gas diffusion layer having a mean pore size within a controlled range, such as 10 microns or 20 microns.

In another aspect, the invention provides a fuel cell system with a PEM fuel cell operating at a temperature of less than 100° C. (e.g., less than 85° C.). The fuel cell has an anode differential pressure less than 1 psig and a cathode differential pressure less than 1 psig. The fuel cell has an MEA operating at a voltage of at least 0.4 volts and a current density of at least 0.4 amps/cm^2. The fuel cell has an anode gas diffusion layer and a cathode gas diffusion layer, wherein the anode gas diffusion layer is more hydrophilic than the cathode gas diffusion layer such that the water ratio of the fuel cell is at least 2 (e.g., greater than 3 or 4 in some cases).

In another aspect, a fuel cell system is provided that has a PEM with an anode side and a cathode side. The anode side is adapted to receive protons from an anode catalyst, and the cathode side is adapted to react the protons with oxygen. A hydrophilic anode gas diffusion layer is adapted to transport hydrogen to the anode catalyst and water to the anode side of the PEM. A hydrophobic cathode gas diffusion layer adapted to transport water away from the cathode side of the PEM and away from the cathode catalyst.

In another aspect, the invention provides a method of operating a fuel cell, including at least the following steps: (1) flowing hydrogen through a hydrophilic gas diffusion layer to an anode catalyst associated with a fuel cell membrane; (2) flowing oxygen through a hydrophobic gas diffusion media to a cathode catalyst associated with a fuel cell membrane; (3) condensing liquid water onto the hydrophilic gas diffusion layer such that the condensed water is drawn to the fuel cell membrane; and (4) producing product water at the cathode catalyst, such that the product water is drawn through the hydrophobic gas diffusion layer away from the cathode catalyst.

In some embodiments, such methods may further include the steps of operating the fuel cell at a temperature of less than 100° C.; providing an anode differential pressure less than 1 psig and a cathode differential pressure less than 1 psig; and operating at the fuel cell at a voltage of at least 0.4 volts and a current density of at least 0.4 amps/cm^2.

Other embodiments of systems and methods under the invention may include any of the features, aspects or steps described herein, either alone or in combination. Advantages and other features of the invention will become apparent from the following description, drawing and claims.

DETAILED DESCRIPTION

In one aspect, a fuel cell is provided that has a hydrophilic anode gas diffusion layer. In this context, the term hydrophilic refers to a material that is wettable with liquid water. For example, contact angle is one measure of the wetting of a liquid on a solid surface. It is expressed in degrees, with 0° being complete wetting and 180° being absolute non-wetting. One equation (3) used to express contact angle in terms of the properties of a given solid and liquid is as follows:

$$\cos(\theta) = (\Delta P * r)/2\gamma \quad (3)$$

Where $\theta$ is the contact angle, $\Delta P$ is the differential pressure between the solid and liquid, r is the pore size of the solid, and $\gamma$ is the surface tension of the liquid. The differential pressure can be approximated as the pressure differential through the fuel cell flow field. For example, for an atmospheric PEM fuel cell with an anode inlet pressure of 1 psig and an anode outlet pressure of about 0 psig, the differential pressure for the calculation of contact angle would be taken as 1 psig.

Figure 8A:
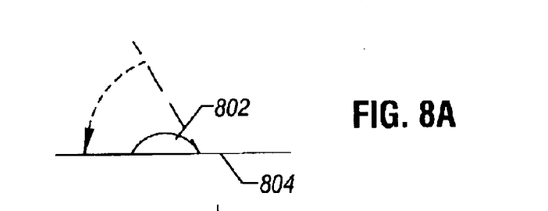
FIG. 8A is a diagram illustrating the contact angle of a liquid on a surface.
Figure 8B:
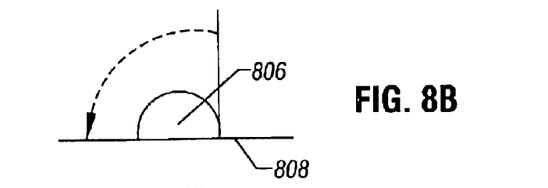
FIG. 8B is a diagram illustrating the contact angle of a liquid on a surface.
Figure 8C:
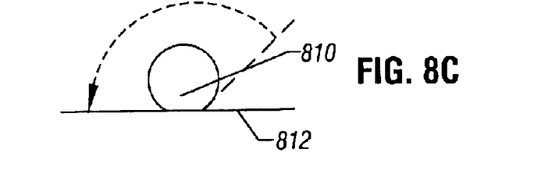
FIG. 8C is a diagram illustrating the contact angle of a liquid on a surface.

FIG. 8A shows a drop of liquid 802 on a surface 804 wherein the contact angle is less than 90°. FIG. 8B shows a drop of liquid 806 on a surface 808 wherein the contact angle is about 90°. FIG. 8C shows a drop of liquid 810 on a surface 812 wherein the contact angle is greater than 90°. In some embodiments, it may be preferable that the contact angle of the anode GDL with respect to water is less than about 140°. In other embodiments, it may be preferable to have a contact angle of the anode GDL of less than about 120° with respect to a drop of water. In other embodiments, even lower contact angles may be desirable.

Figure 7:
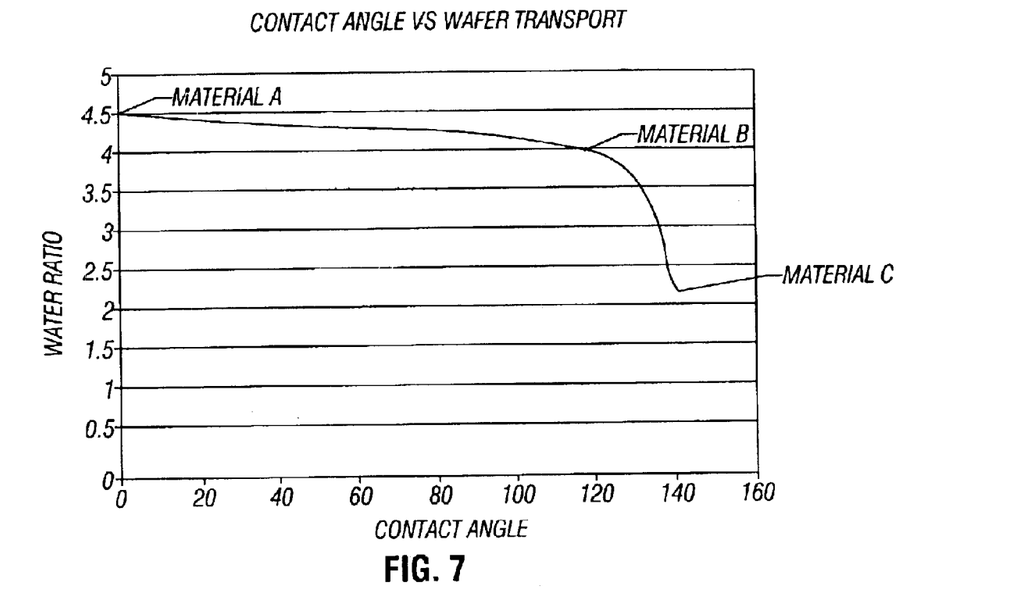
FIG. 7 is a graph of the water transport characteristics of a fuel cell with respect to the wetting characteristics of the anode GDL.

Referring to FIG. 7, a graph illustrates a relationship between contact angle and the water transport characteristics between the anode and cathode sides of a fuel cell. Water transport is represented as a ratio of the amount of water exhausted from the cathode of a fuel cell divided by the amount of water exhausted from the anode of the fuel cell. The graph of FIG. 7 was generated on the basis of three data points obtained from testing three different carbon paper GDL materials, each having a different mean pore size and pore size distribution (see FIG. 9). The fuel cell tested was a near atmospheric cell (less than about 1 psig) using a Gore Select™ membrane material at an operating temperature of about 70° C. On the basis of this test and on empirical observations of cell voltage performance (not shown), it was determined that a water ratio of greater than 2 was preferable, and that even higher ratios were better, such as 4 or higher.

From the graph shown in FIG. 7, this corresponds roughly to a contact angle of less than 140° being needed to provide a water ratio of greater than 2, and a contact angle of less than 120° being needed to provide a water ratio of greater than 4. However, it should be noted that this relationship is provided for illustration purposes only, and that the relation of these parameters may change for other systems and materials. Still, in one aspect, the invention may be defined as a method of operating a fuel cell wherein the water ratio is maintained above a predetermined level, such as 2 or 4.

It will be appreciated that the surface tension of pure water tends to remain fairly constant, so that variation in the wetting characteristics of the GDL tends to be achieved according to other factors. However, in some cases, the GDL material may be selected, or a material associated with the GDL may be selected, to promote wetting by affecting the surface tension of the water.

In some embodiments, it may be desirable to achieve desired wetting characteristics by adjusting the operating pressure of the fuel cell. For example, it may be desirable to operate a fuel cell for an automotive application at a relatively high pressure (e.g., greater than 10 psig) because the higher pressure contributes to a higher ratio of power output to weight, and the parasitic load on the system associated with maintaining reactant pressure may be justified. In other embodiments, such as high efficiency stationary applications, lower operating pressures may be desired. In low pressure embodiments, and in general, the desired wetting characteristics of the GDL may be achieved by selection of the pore size characteristics of the GDL material (mean pore size and pore size distribution, as examples).

Figure 9:
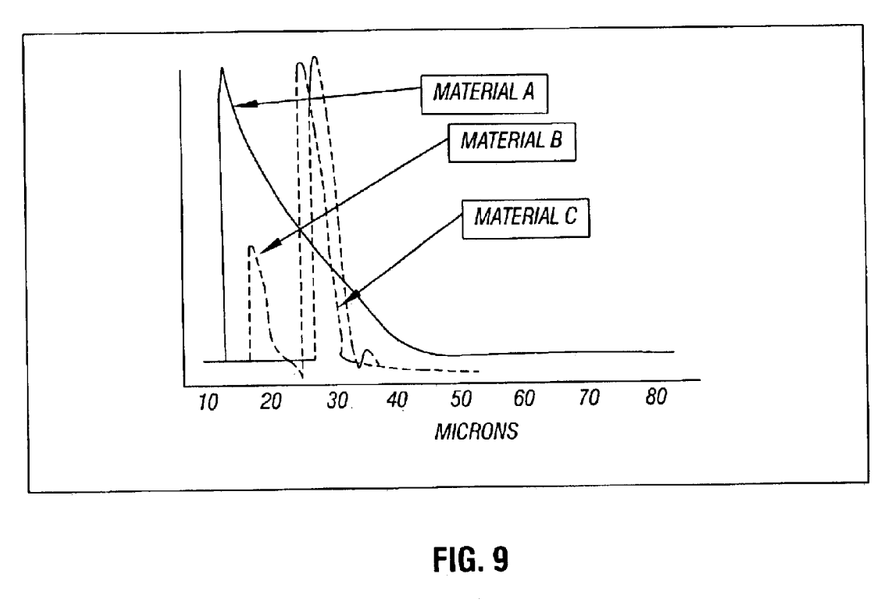
FIG. 9 is a graph of the percent distribution versus pore size for 3 carbon paper GDL materials.

Referring to FIG. 9, a graph shows the percent distribution of pore size (in microns) for the three carbon paper GDL materials used to generate the graph of FIG. 7. The basic difference between the materials shown is that each has a different mean pore size and pore size distribution. Carbon paper is a well known material and is widely available from a number of commercial sources. In each case, raw, un-coated carbon paper was used. Of the three materials, referring to the performance indicated by FIG. 7, Material A performed the best, followed by Material B, and then by Material C. Thus, it is concluded that it may be preferable to use an anode GDL, and a carbon paper anode GDL in particular, that has a mean pore size less than about 20 microns. In other embodiments, it may be preferable to use a carbon paper anode GDL material having a mean pore size less than about 10 microns. It may be further preferable in some embodiments for the material to have a relatively close pore size distribution.

In some embodiments, an anode GDL material may be selected that provides the desired wetting characteristics. For example, it has been found that a carbon paper or carbon cloth material with a mean pore size of about 10 microns can provide a suitable hydrophilic anode GDL. However, it is noted that carbon GDL materials must be selected or processed (e.g., pre-pressed or polished) to minimize the number of rigid fibers oriented away from the general plane of the PEM. Otherwise, such fibers can tend to puncture the PEM as the GDL's are compressed against the PEM in the fuel cell. In other embodiments, non-carbon GDL materials can be used, such as a hydrophilic paper or polymer. Such materials are well known in various industries and are widely available. It is a requirement that the GDL be electrically conductive, so a conductive material such as a carbon-based powder may be added to such materials where necessary.

In some embodiments, a GDL material such as carbon paper or cloth may be impregnated with a hydrophilic material to impart the desired wetting characteristics. For example, a carbon paper or carbon cloth GDL may be soaked in a silica solution and dried. In general, it is preferable for the hydrophilic material to be homogeneously impregnated throughout the GDL. However, in some embodiments, the hydrophilic material may be a layer or coating on the GDL, or may be heterogeneously impregnated. In general, the hydrophilic material can be any hydrophilic oxide, oxy hydroxide, or any other material compatible with the fuel cell environment and having an affinity for water. A fibrous material including hydroxyl groups may also be suitable as a GDL or GDL component.

In the context of this invention, PEM refers to any fuel cell membrane that transports protons (including membranes for high temperature and direct methanol fuel cell systems, etc.). In some embodiments, it may be preferable to utilize the invention with fuel cell membranes such as sulphonated fluorocarbon polymers that are capable of transporting water in either direction between the anode and cathode. Many suitable membranes are known in the art, and the invention is not intended to be limited according to the membrane utilized, except as specifically claimed.

While embodiments of the invention generally do not depend on the properties of the cathode GDL, in some embodiments, it may be preferable for a system under the present invention to further include a cathode gas diffusion layer associated with the fuel cell that is hydrophobic, having a contact angle greater than that of the anode GDL, or close to 180°. For example, the cathode GDL may be naturally hydrophobic, or may be impregnated with polytetrafluoroethylene or some other material to impart this characteristic.

Figure 6:
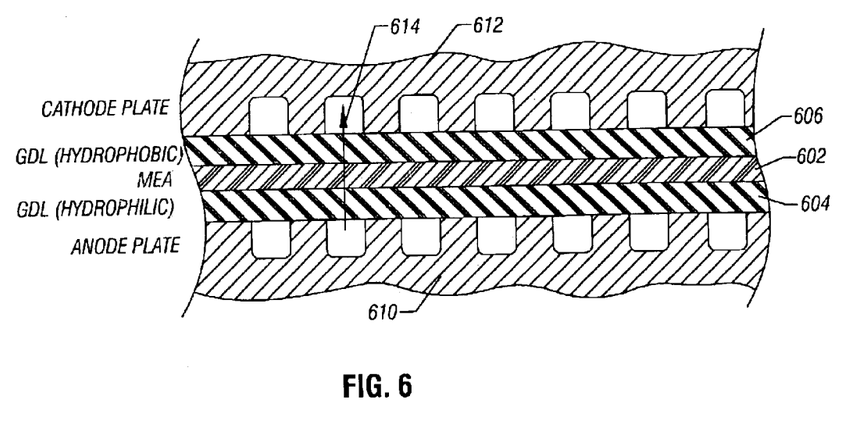
FIG. 6 is a partial cutaway view of a fuel cell.

For example, referring to FIG. 6, an MEA 602 is sandwiched between a hydrophilic anode GDL 604 and a hydrophobic cathode GDL 606, and these components are sandwiched between an anode flow field plate 610 and a cathode flow field plate 612. This configuration promotes the flow of water through the fuel cell from anode to cathode as shown by arrow 614. If the anode GDL was hydrophobic, as is common in the prior art, the movement of water would be promoted away from both the anode GDL and the cathode GDL. An advantage of the hydrophilic anode GDL 604 is improved water management, which includes a greater tendency of the anode GDL 604 to promote hydration of the membrane 602, and improved tolerance of the anode GDL 604 against becoming flooded, or water logged with liquid water during operation.

Figure 5:
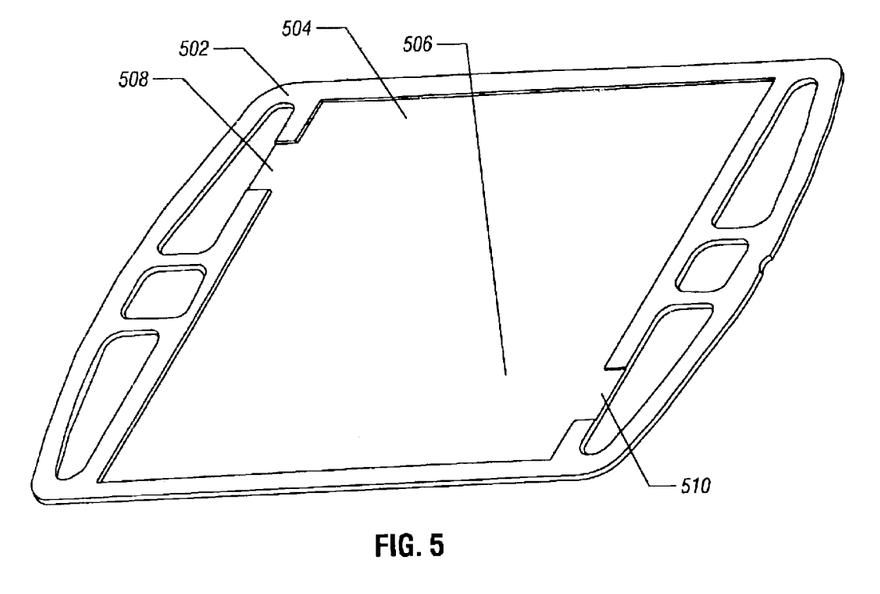
FIG. 5 is a perspective view of a fuel cell flow field plate with GDL.

Referring to FIG. 5, a flow field plate 502 is shown that is similar to the plate 90 shown in FIG. 3. Plate 502 is fitted with a hydrophilic anode GDL 504 under the present invention. In this particular embodiment, the GDL 504 includes an active area region 506, and inlet and outlet regions (508 and 510, respectively).

Further embodiments of the invention may include apparatus and methods based on any combination of the features and aspects described above.

While the invention has been disclosed with respect to a limited number of embodiments, those skilled in the art, having the benefit of this disclosure, will appreciate numerous modifications and variations therefrom. It is intended that the invention covers all such modifications and variations as fall within the true spirit and scope of the invention.

What is claimed is:

1. A fuel cell system, comprising:
   a fuel cell having an anode gas diffusion layer, the anode gas diffusion layer having a contact angle with water less than 140°.

2. The fuel cell system of claim 1, wherein the contact angle is less than 120°.

3. The fuel cell system of claim 2, further comprising a cathode gas diffusion layer, the cathode gas diffusion layer having a contact angle with water greater than 120°.

4. The fuel cell system of claim 1, wherein the contact angle is less than 100°.

5. The fuel cell system of claim 1, further comprising a cathode gas diffusion layer, the cathode gas diffusion layer having a contact angle with water greater than 140°.

6. The fuel cell system of claim 1, wherein the gas diffusion layer comprises a substrate impregnated with a material such that the contact angle with water of the gas diffusion layer with the material is less than the contact angle with water for the gas diffusion layer without the material.

7. The fuel cell system of claim 1, wherein the gas diffusion layer comprises a carbon paper.

8. The fuel cell system of claim 7, wherein the gas diffusion layer comprises a substrate impregnated with a material such that the contact angle with water of the gas diffusion layer with the material is less than the contact angle with water for the gas diffusion layer without the material.

9. The fuel cell system of claim 7, wherein the anode gas diffusion layer has a mean pore size of less than 20 microns.

10. The fuel cell system of claim 1, wherein the gas diffusion layer comprises a carbon cloth.

11. The fuel cell system of claim 10, wherein the gas diffusion layer comprises a substrate impregnated with a material such that the contact angle with water of the gas diffusion layer with the material is less than the contact angle with water for the gas diffusion layer without the material.

12. The fuel cell system of claim 11, wherein the material is an oxide.

13. The fuel cell system of claim 11, wherein the material is silica.

14. The fuel cell system of claim 10, wherein the anode gas diffusion layer has a mean pore size of less than 20 microns.

15. The fuel cell system of claim 1, wherein the anode gas diffusion layer has a mean pore size of less than 20 microns.

16. The fuel cell system of claim 1, wherein the anode gas diffusion layer has a mean pore size of less than 10 microns.

17. The fuel cell system of claim 1, wherein the fuel cell is a PEM fuel cell.

18. The fuel cell system of claim 17, wherein the fuel cell comprises a sulphonated fluorocarbon polymer membrane.

19. A fuel cell system, comprising:
a fuel cell having an anode gas diffusion layer, and a cathode gas diffusion layer, wherein the anode gas diffusion layer is more hydrophilic than the cathode gas diffusion layer.

20. The fuel cell system of claim 19, wherein the anode gas diffusion layer is at least 10% more hydrophilic than the cathode gas diffusion layer.

21. The fuel cell system of claim 19, wherein the anode gas diffusion layer has a first contact angle with water, wherein the cathode gas diffusion layer has a second contact angle with water, and wherein the first contact angle is greater than the second contact angle.

22. The fuel cell system of claim 21, wherein the first contact angle is at least 10% greater than the second contact angle.

23. The fuel cell system of claim 21, wherein the first contact angle is at least 20% greater than the second contact angle.

24. The fuel cell system of claim 19, wherein the anode gas diffusion layer comprises a substrate impregnated with a material such that the anode gas diffusion layer with the material is more hydrophilic than the anode gas diffusion layer without the material.

25. The fuel cell system of claim 24, wherein the material is an oxide.

26. The fuel cell system of claim 24, wherein the material is silica.

27. A fuel cell system, comprising:
a PEM fuel cell operating at a temperature of less than 100° C., wherein the fuel cell has an anode differential pressure less than 1 psig and a cathode differential pressure less than 1 psig, wherein the fuel cell comprises an MEA operating at a voltage of at least 0.4 volts and a current density of at least 0.4 amps/cm^2, wherein the fuel cell comprises an anode gas diffusion layer and a cathode gas diffusion layer, wherein the anode gas diffusion layer is more hydrophilic than the cathode gas diffusion layer such that the water ratio of the fuel cell is at least 2.

28. The fuel cell system of claim 27, wherein the temperature is less than 85° C.

29. The fuel cell system of claim 28, wherein the water ratio of the fuel cell is at least 3.

30. The fuel cell system of claim 28, wherein the water ratio of the fuel cell is at least 4.

31. A fuel cell system, comprising:
a PEM having an anode side and a cathode side, wherein the anode side is adapted to receive protons from an anode catalyst, and the cathode side is adapted to react the protons with oxygen,
a hydrophilic anode gas diffusion layer adapted to transport hydrogen to the anode catalyst and water to the anode side of the PEM, and
a hydrophobic cathode gas diffusion layer adapted to transport water away from the cathode side of the PEM and away from the cathode catalyst.

32. A gas diffusion layer for a hydrogen electrode of a PEM fuel cell, comprising:
a carbon fiber media having a water contact angle of less than 140°.

33. The gas diffusion layer of claim 32, wherein the water contact angle of less than 120°.

34. The gas diffusion layer of claim 32, wherein the water contact angle of less than 110°.

35. A method of operating a fuel cell, comprising:
flowing hydrogen through a hydrophilic gas diffusion layer to an anode catalyst associated with a fuel cell membrane;
flowing oxygen through a hydrophobic gas diffusion media to a cathode catalyst associated with a fuel cell membrane;
condensing liquid water onto the hydrophilic gas diffusion layer such that the condensed water is drawn to the fuel cell membrane; and
producing product water at the cathode catalyst, such that the product water is drawn through the hydrophobic gas diffusion layer away from the cathode catalyst.

36. The method of claim 35, wherein the fuel cell comprises a sulphonated fluorocarbon polymer membrane, further comprising:
operating the fuel cell at a temperature of less than 100° C.;
providing an anode differential pressure less than 1 psig and a cathode differential pressure less than 1 psig; and
operating at the fuel cell at a voltage of at least 0.4 volts and a current density of at least 0.4 amps/cm^2.

* * * * *